(12) United States Patent
Kim et al.

(10) Patent No.: US 11,425,270 B2
(45) Date of Patent: Aug. 23, 2022

(54) MANAGING USER-DEFINED SERVICE

(71) Applicant: Hewlett-Packard Development Company, L.P., Spring, TX (US)

(72) Inventors: Hyoeun Kim, Pangyo (KR); Juho Eum, Pangyo (KR); Yunjong Lee, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/297,972

(22) PCT Filed: Jan. 10, 2020

(86) PCT No.: PCT/US2020/013020
§ 371 (c)(1),
(2) Date: May 27, 2021

(87) PCT Pub. No.: WO2021/011027
PCT Pub. Date: Jan. 24, 2021

(65) Prior Publication Data
US 2022/0150369 A1    May 12, 2022

(30) Foreign Application Priority Data
Jul. 17, 2019   (KR) ........................ 10-2019-0086126

(51) Int. Cl.
*G06F 3/12* (2006.01)
*H04N 1/00* (2006.01)

(52) U.S. Cl.
CPC ..... *H04N 1/00344* (2013.01); *H04N 1/00042* (2013.01); *H04N 1/00941* (2013.01); *H04N 1/00954* (2013.01)

(58) Field of Classification Search
CPC .......... H04N 1/00344; H04N 1/00042; H04N 1/00941; H04N 1/00954
See application file for complete search history.

(56) References Cited

U.S. PATENT DOCUMENTS

| 8,937,732 B2 | 1/2015 | Jang et al. |
| 2008/0304090 A1* | 12/2008 | Shimmoto .............. G06F 9/485 358/1.13 |
| 2012/0019855 A1 | 1/2012 | Takahashi et al. |
| 2012/0057193 A1 | 3/2012 | Jazayeri et al. |
| 2012/0218576 A1 | 8/2012 | Sekine et al. |

(Continued)

FOREIGN PATENT DOCUMENTS

| CN | 9358896 | 2/2019 |
| JP | 2001290629 | 10/2001 |
| KR | 1478708 | 12/2014 |

*Primary Examiner* — Moustapha Diaby
(74) *Attorney, Agent, or Firm* — Jefferson IP Law, LLP

(57) ABSTRACT

An image forming apparatus may include a memory storing computer-executable instructions and a processor. The processor is to execute the computer-executable instructions to execute a service program management module of an application framework layer, according to a request of a user-defined service program having application service rights of an application layer, register a service provided by the user-defined service program in the service program management module, request an operation of a system service requiring system service rights of an operating system layer, and manage the registered service.

15 Claims, 7 Drawing Sheets

(56) References Cited

U.S. PATENT DOCUMENTS

| | | | |
|---|---|---|---|
| 2014/0029029 A1* | 1/2014 | Akuzawa | G06T 11/00 |
| | | | 358/1.11 |
| 2015/0222774 A1* | 8/2015 | Osawa | H04N 1/00941 |
| | | | 358/1.15 |
| 2017/0060798 A1* | 3/2017 | Sakai | G06F 3/1201 |
| 2017/0178212 A1 | 6/2017 | Glasgow et al. | |
| 2017/0201651 A1* | 7/2017 | Sugiyama | H04N 1/00344 |

* cited by examiner

MANAGING USER-DEFINED SERVICE

BACKGROUND

Android-based service programs that perform a task in the background without a user interface (UI) may be classified into system-provided service programs and user-defined service programs. A system-provided service program is installed along with firmware when a product is produced and provides a system service requiring system service rights. A user-defined service program that is a service program developed and provided by a third party may additionally be installed on a product and provide a service defined or desired by a user.

DETAILED DESCRIPTION OF EXAMPLES

Figure 1:
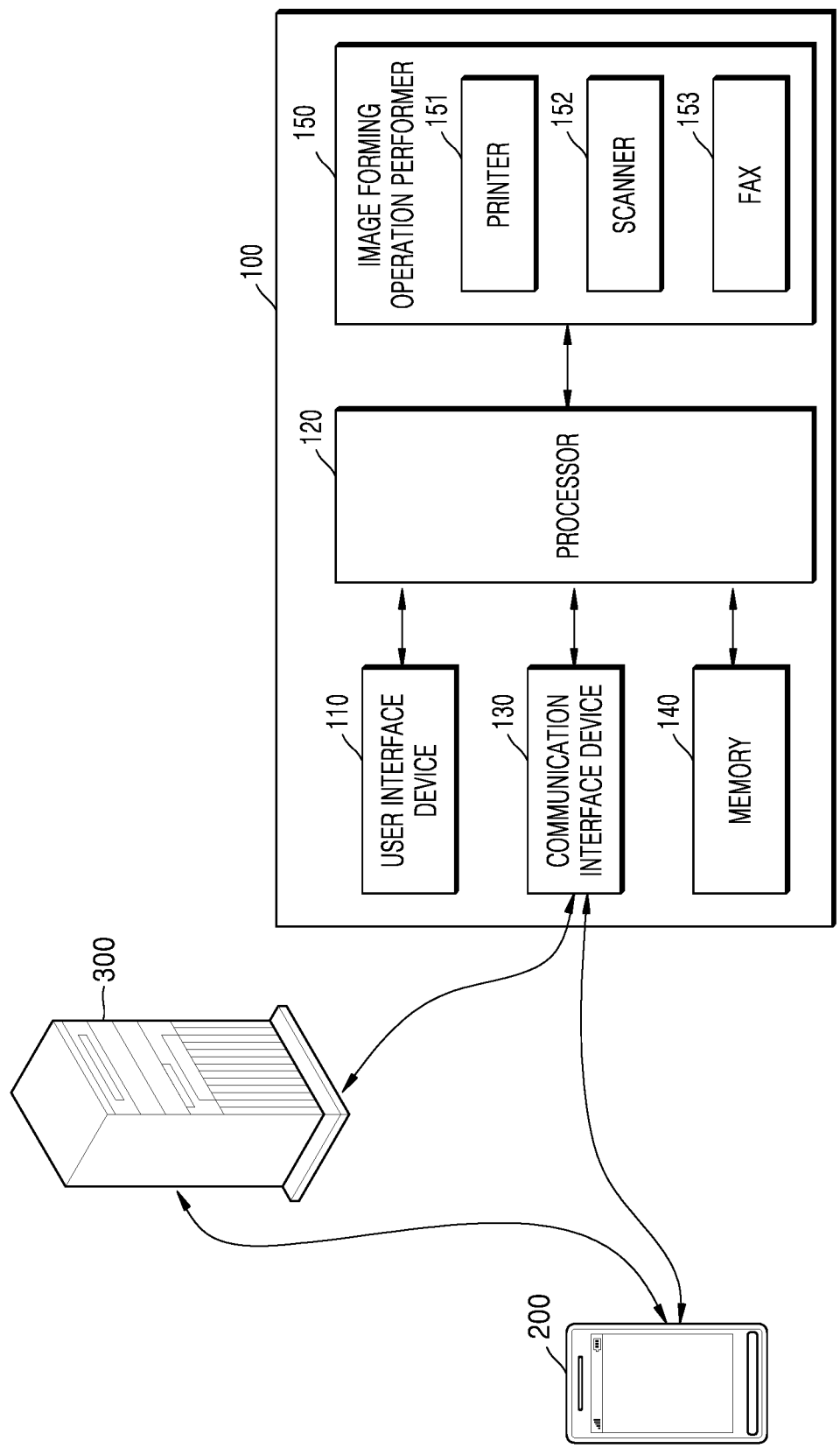
FIG. 1 is a diagram for describing a configuration and an operation of an image forming apparatus connected to an external apparatus according to an example.

Reference will now be made to various examples that are illustrated in the accompanying drawings. In the drawings, elements having substantially the same functions are denoted by the same reference numerals, and a repeated explanation thereof will not be given.

FIG. 1 is a diagram for describing a configuration and an operation of an image forming apparatus connected to an external apparatus according to an example.

Referring to FIG. 1, an image forming apparatus 100 may include a user interface device 110, a processor 120, a communication interface device 130, a memory 140, and an image forming operation performer 150. Also, although not shown in FIG. 1, the image forming apparatus 100 may further include a power supply for supplying power to each element.

The user interface device 110 may include an input unit for receiving an input for performing an image forming operation from a user, and an output unit for displaying information such as a state of the image forming apparatus 100 or a result of an image forming operation.

The processor 120 may control an overall operation of the image forming apparatus 100 and may include at least one processor such as a central processing unit (CPU). The processor 120 may control other elements included in the image forming apparatus 100 to perform an operation corresponding to a user input received through the user interface device 110. The processor 120 may include at least one specialized processor corresponding to a predetermined function. The processor 120 may execute a program stored in the memory 140, may read data or a file stored in the memory 140, or may store a new program or an application in the memory 140.

The communication interface device 130 may perform wired/wireless communication with another device or network. To this end, the communication interface device 130 may include a communication module (e.g., a transceiver) that supports at least one of various wired/wireless communication methods. The communication interface device 130 may be connected to an external apparatus located outside the image forming apparatus 100 and may transmit/receive data or a signal to/from the external apparatus. As illustrated in FIG. 1, the image forming apparatus 100 may be connected to a user terminal 200 or a server 300 through the communication interface device 130. Examples of the user terminal 200 may include a smartphone, a tablet, a personal computer (PC), a camera, a wearable device, or the like.

Various types of data such as an application, a program, and a file may be stored in the memory 140. The processor 120 may access and use data stored in the memory 140 or may store new data in the memory 140. Also, the processor 120 may install a program stored in the memory 140 on the image forming apparatus 100 and may execute the program. Also, the processor 120 may install a program or an application received from an external source through the communication interface device 130 on the image forming apparatus 100.

The image forming operation performer 150 may perform an image forming operation such as printing, copying, scanning, or faxing. A printer 151 may form an image on a recording medium by using any of various printing methods such as an electrophotographic method, an inkjet method, a thermal transfer method, a direct thermal method, or the like. A scanner 152 may emit light to a document and may read an image recorded on the document by receiving reflected light. A fax 153 may share a configuration for scanning an image with the scanner 152, may share a configuration for printing a received file with the printer 151, and may transmit a scan file to a destination or may receive a file from the outside.

In various examples, the names of elements of the image forming apparatus 100 may be changed. Also, the image forming apparatus 100 may include at least one of the above elements, may omit some elements, or may further include additional elements.

The user interface device 110 of FIG. 1 may include a separate control system. That is, separate from the processor 120 of the image forming apparatus 100, the user interface device 110 may include a control system (e.g., a processor and a memory) that operates in the user interface device 110. An operating system and programs for supporting various functions may be installed on the control system of the user interface device 110. An example of a user interface device will be given with reference to FIG. 2.

Figure 2:
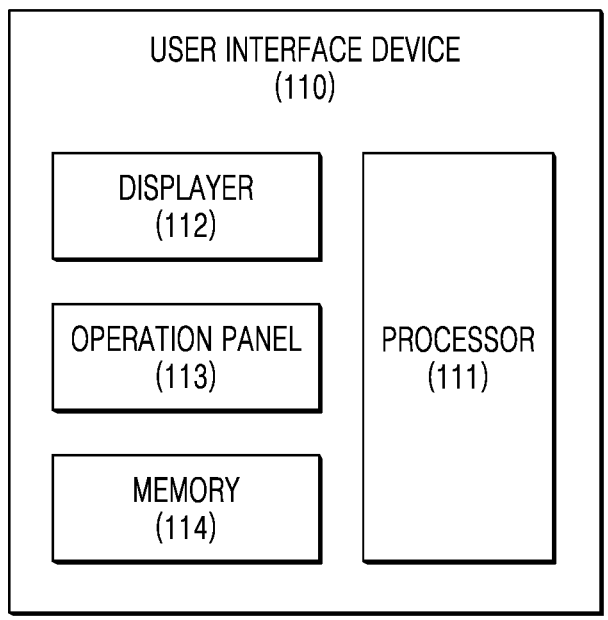
FIG. 2 is a block diagram illustrating a configuration of a user interface device according to an example.

FIG. 2 is a block diagram illustrating a configuration of a user interface device according to an example.

Referring to FIG. 2, the user interface device 110 may include a processor 111, a displayer 112, an operation panel 113, and a memory 114.

As shown in FIG. 2, the user interface device 110 may include the processor 111 and the memory 114, separate from the processor 120 and the memory 140. The processor 111 may include at least one processor such as a CPU. The user interface device 110 may include the memory 114 that stores computer-executable instructions and at least one processor 111 that executes the computer-executable instructions stored in the memory 114.

The displayer 112 may include a liquid-crystal display (LCD) panel, a light-emitting diode (LED) panel, an organic LED (OLED) panel, or the like, and the operation panel 113 may include a physical button or a touchscreen. The user interface device 110 may further include a communicator (e.g., a communication interface device, not shown) for performing communication with an external apparatus.

As described above, the image forming apparatus 100 or the user interface device 110 provided in the image forming apparatus 100 may include the memory 140 or the memory 114 that stores computer-executable instructions and the processor 120 or the processor 111 that executes the computer-executable instructions, and may execute programs for supporting various functions.

Programs installed and executed on the image forming apparatus 100 may include "application programs" that receive a user's input through a user interface and provide a corresponding output and "service programs" that are executed in the background without a user interface. The service programs may include a "system-provided service program" that is installed during production of the image forming apparatus 100 and a "user-defined service program" that is later developed and additionally installed by a vendor of the image forming apparatus 100 or a third party. The system-provided service program may provide a system service requiring system service rights whereas the user-defined service program may have only application service rights and thus may not provide a service requiring a function performed by the system service.

An example method for allowing a user-defined service program installed on the image forming apparatus 100 to use a function provided by a system service requiring system service rights and provide various services will be described based on an Android platform architecture.

Figure 3:
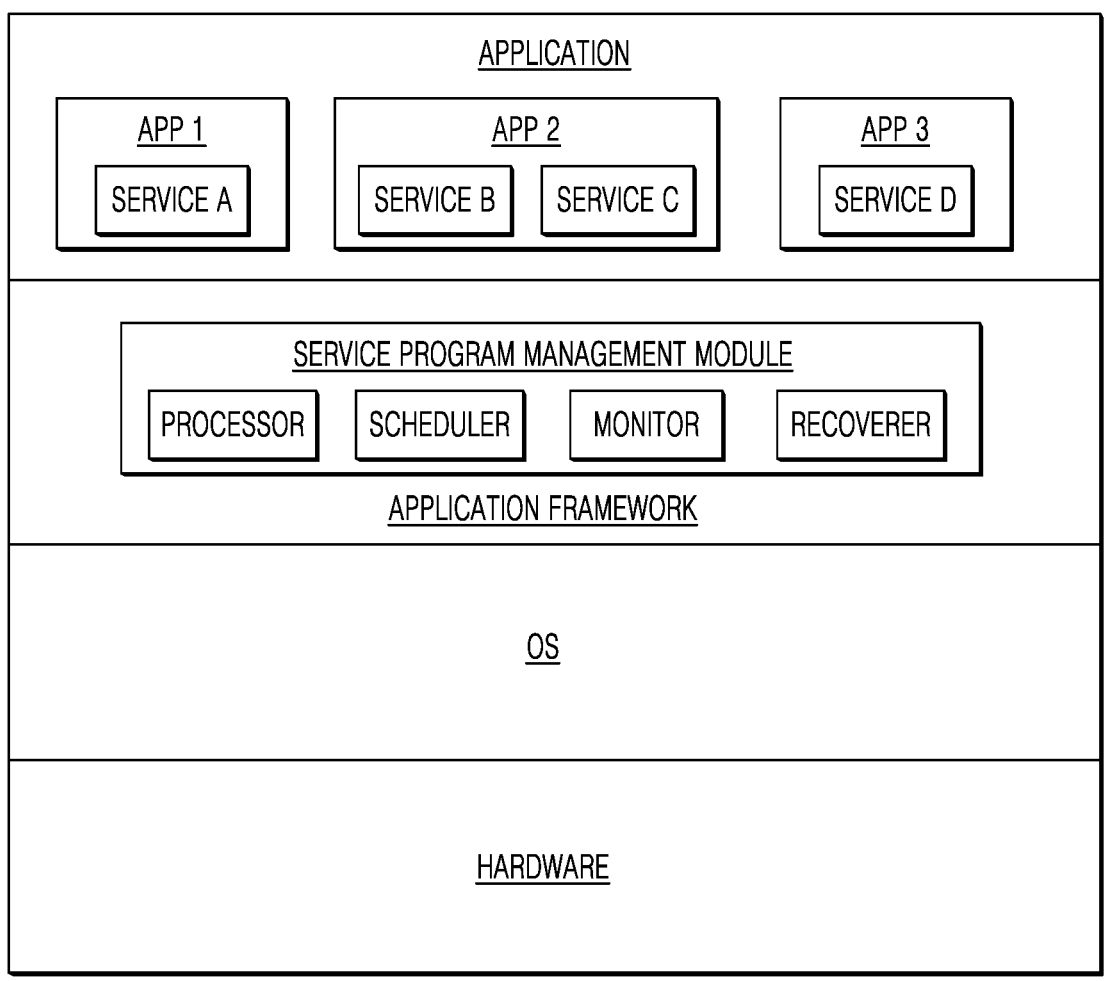
FIG. 3 is a diagram for describing layers to which a user-defined service program and a service program management module belong in an Android platform architecture according to an example.

FIG. 3 is a diagram for describing layers to which a user-defined service program and a service program management module belong in an Android platform architecture according to an example.

Referring to FIG. 3, a layer structure of an Android platform architecture may include a hardware layer that is a lowermost layer, an operating system (OS) layer located on the hardware layer, an application framework layer located on the operating system layer, and an application layer located on the application framework layer.

The operating system layer corresponding to a Linux kernel portion is a layer to which device drivers of various hardware, a booting or file system, etc. belong.

The application framework layer is a layer to which a standard framework necessary to install and execute an Android-based application belongs.

The application layer is a layer to which an Android-based application installed on the image forming apparatus 100 belongs. A user-defined service program may belong to the application layer and may be additionally installed as an Android-based program on the image forming apparatus 100.

As shown in FIG. 3, various user-defined service programs (e.g., App 1, App 2, and App 3) belonging to the application layer may be installed on the image forming apparatus 100, and at least one service may be provided from each of the user-defined service programs.

In an example, in order for a user-defined service program to provide a service requiring a function performed by a system service, a service program management module is provided as an intermediate software module that connects a user-defined service program of the application layer to a system framework that provides a system service of the operating system layer.

In the layer structure of FIG. 3, the service program management module may belong to the application framework layer and may be installed as system firmware during production of the image forming apparatus 100.

Referring again to FIGS. 1 and 2, the image forming apparatus 100 may include the memory 140 or the memory 114 that stores computer-executable instructions and the processor 120 or the processor 111 that executes the computer-executable instructions stored in the memory 140 or the memory 114.

By executing the computer-executable instructions, the processor 120 or the processor 111 may execute the service program management module of the application framework layer. According to a request of the user-defined service program having application service rights of the application layer, the processor 120 or the processor 111 may register a service provided by the user-defined service program in the service program management module. Also, the processor 120 or the processor 111 may request an operation of a system service requiring system service rights of the operating system layer and may manage the registered service.

The service provided by the user-defined service program that relates to a function that may be used to operate the image forming apparatus 100 or a function related to an event occurring in the image forming apparatus 100 may require a function performed by the system service such as always-on execution, automatic execution, automatic recovery, or the like.

For example, the service provided by the user-defined service program may be any one from among a function of collecting error logs of the image forming apparatus 100, a function of managing an image forming operation that is performed and completed in the image forming apparatus 100, a function of managing a peripheral device connected to the image forming apparatus 100, or the like.

A service such as the function of collecting the error logs of the image forming apparatus involves collecting, whenever an error occurs during an operation in the background, information related to the error and recording or transmitting the information to an internal or external database of the image forming apparatus 100. To this end, the function of collecting the error logs of the image forming apparatus 100 should be able to be always executed and should be able to be automatically executed whenever the image forming apparatus 100 is turned on and re-booted.

A service such as the function of managing the image forming operation that is performed and completed in the image forming apparatus 100 may involve collecting, when the image forming operation performed by the image forming apparatus 100 is completed, information related to the completed image forming operation and recording or transmitting the information to the internal or external database of the image forming apparatus 100. To this end, the function of managing the image forming operation that is performed and completed in the image forming apparatus 100 should be able to be always executed.

A service related to the function of managing the peripheral device connected to the image forming apparatus 100 may involve collecting, whenever the peripheral device is connected to the image forming apparatus 100 or there is an input from or an output to the peripheral device, information related to the connected peripheral device in real time. To this end, the function of managing the peripheral device connected to the image forming apparatus 100 should be able to be always executed.

By executing the computer-executable instructions, the processor 120 or the processor 111 may obtain an identifier of the user-defined service program, an identifier of the service provided by the user-defined service program, a start condition of the service provided by the user-defined service program, and a termination condition of the service provided by the user-defined service program, defined as metadata during installation or transmitted as parameters during initial execution of the user-defined service program, and may register the service provided by the user-defined service program in a queue of a scheduler of the service program management module.

By executing the computer-executable instructions, the processor 120 or the processor 111 may request an operation of the system service of the operating system layer according to the start condition or the termination condition of the registered service and may manage the start or termination of the registered service.

By executing the computer-executable instructions, when the registered service is abnormally terminated while a life cycle of the registered service is monitored, for example, when the registered service is unexpectedly terminated because a system stops, an error occurs, or the service crashes or stops, the processor 120 or the processor 111 may request an operation of the system service of the operating system layer, and may manage the re-start of the terminated service.

By executing the computer-executable instructions, the processor 120 or the processor 111 may request an operation of the system service corresponding to always-on execution, automatic execution, automatic recovery, or the like, and manage the registered service.

An example method, performed by the image forming apparatus 100, of managing a service provided by a user-defined service program by operating the processor 120 or the processor 111 in the image forming apparatus 100 will be described in more detail with reference to FIGS. 4 through 7.

Figure 4:
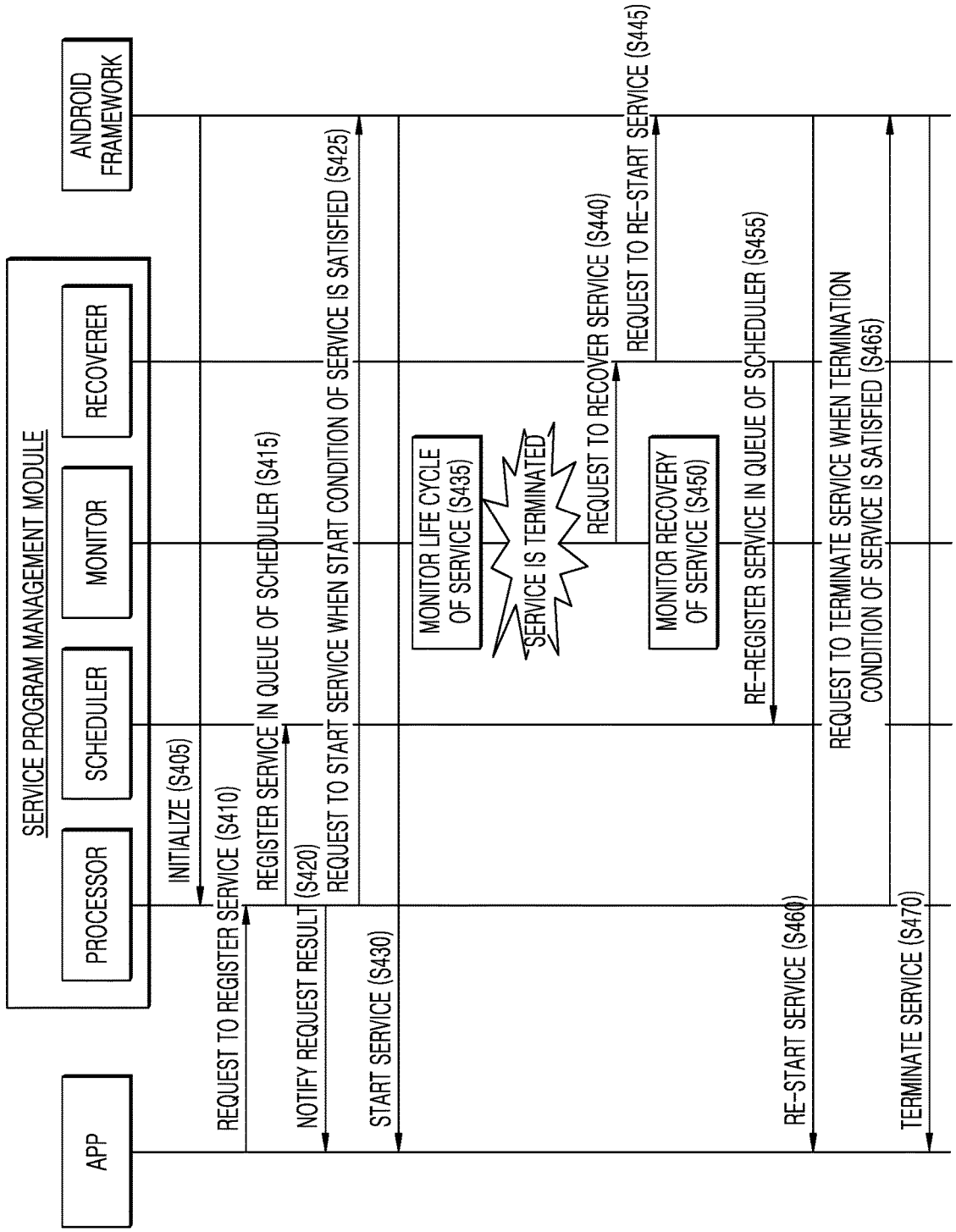
FIG. 4 is a diagram for describing a method of managing a service provided by a user-defined service program by operating a service program management module according to an example.

FIG. 4 is a diagram for describing a method of managing a service provided by a user-defined service program by operating a service program management module according to an example.

The image forming apparatus 100 may include the memory 140 that stores computer-executable instructions and the processor 120 that executes the computer-executable instructions. The user interface device 110 provided in the image forming apparatus 100 may include the memory 114 that stores computer-executable instructions and the processor 111 that executes the computer-executable instructions. Accordingly, a method of managing a service provided by a user-defined service program by executing a service program management module may be performed by the processor 120 or the processor 111 of the user interface device 110.

Referring to FIG. 4, an "App" is a user-defined service program of an application layer, and a "service program management module" is system firmware of an application framework layer. The service program management module may further include modules such as a "processor", a "scheduler", a "monitor", and a "recoverer". An "Android framework" is a system framework that provides a system service of an operating system layer.

In operation S405, when the image forming apparatus 100 is booted, the Android framework may automatically register the processor of the service program management module and may execute the service program management module.

In operation S410, when the App is initially executed or installed, the App may request the service program management module to register a service provided by the App in the service program management module. For example, when a user executes the App installed on the image forming apparatus 100, in order to register a service requiring a function performed by the system service in the service program management module, the App may call an application programming interface (API) and may transmit, as parameters, pieces of information used to register the service provided by the App. The API may call the processor of the service program management module based on the transmitted parameters, and thus the processor of the service program management module may receive a request to register the service provided by the App. The processor of the service program management module may receive as the parameters an identifier of the App, an identifier of the service provided by the App, and a start condition and a termination condition of the service provided by the App. The service provided by the App may be defined as metadata when the App is initially installed on the image forming apparatus 100 and the registration of the service provided by the App may be pre-performed before the App is executed.

In operation S415, the processor of the service program management module may register the information received as the parameters in a queue of the scheduler. The scheduler of the service program management module may register a plurality of services and may limit the number of registered services.

In operation S420, when the information received as the parameters is registered in the queue of the scheduler, the processor of the service program management module may notify a result of the request to register the service of the App.

In operation S425, when the start condition of the registered service is satisfied, the processor of the service program management module may request the Android framework to start the registered service.

In operation S430, the Android framework may start the service provided by the App.

In operation S435, the monitor of the service program management module may monitor a life cycle of the registered service. For example, when an operation condition of the registered service is always-on execution, the monitor of the service program management module may monitor whether the registered service is continuously provided.

A service may be unexpectedly terminated. A service may be abnormally terminated even when a termination condition of the service is not satisfied because, for example, a system stops, an error occurs, a service crashes or stops, or the like.

In operation S440, when the registered service is abnormally terminated, the monitor of the service program management module may request the recoverer to recover the service that is abnormally terminated.

In operation S445, the recoverer of the service program management module may request the Android framework to re-start the service that is abnormally terminated.

In operation S450, the monitor of the service program management module may monitor recovery of the service that is abnormally terminated.

In operation S455, the recoverer of the service program management module may re-register the service requested to be re-started in the queue of the scheduler.

In operation S460, the Android framework may re-start the service provided by the App.

In operation S465, when the termination condition of the registered service is satisfied, the processor of the service program management module may request the Android framework to terminate the registered service.

In operation S470, the Android framework may terminate the service provided by the App.

Figure 5:
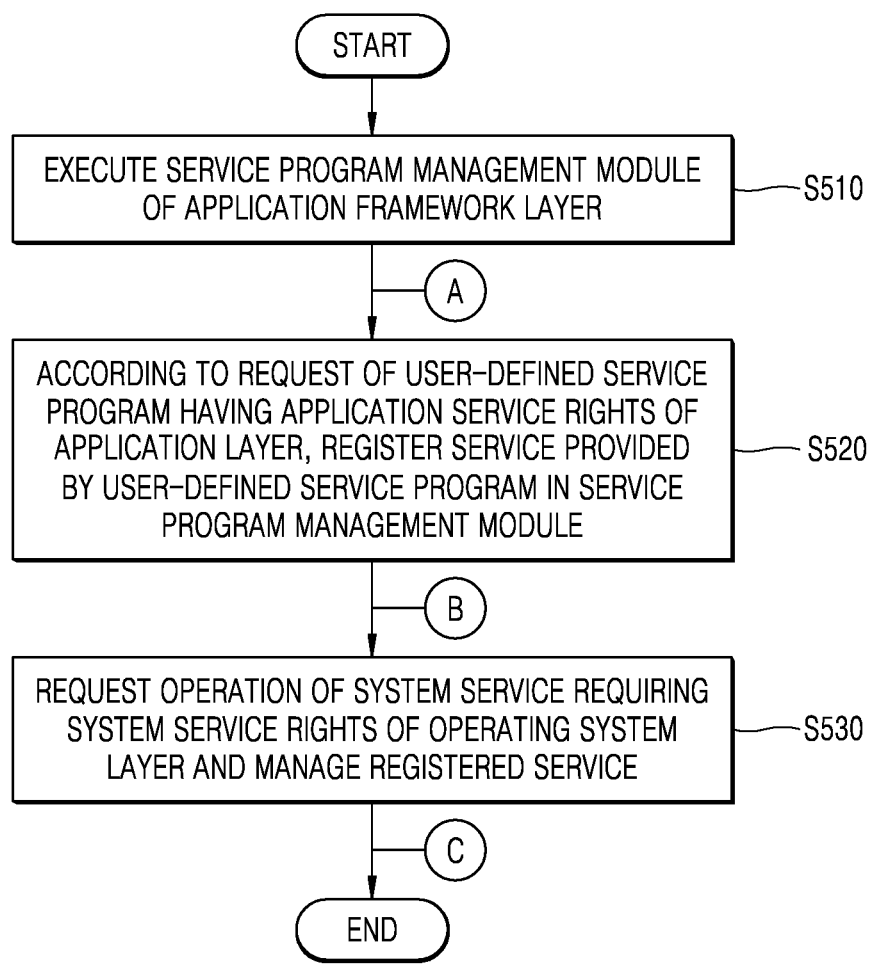
FIG. 5 is a flowchart of a method performed by an image forming apparatus to execute a service program according to an example.

FIG. 5 is a flowchart of a method performed by an image forming apparatus to execute a service program according to an example.

Referring to FIG. 5, the image forming apparatus 100 may execute a service program management module of an application framework layer in operation S510.

The service program management module may be installed as system firmware of the application framework layer during production of the image forming apparatus 100.

In operation S520, according to a request of a user-defined service program having application service rights of an application layer, the image forming apparatus 100 may register a service provided by the user-defined service program in the service program management module.

The user-defined service program may be provided by a vendor of the image forming apparatus 100 or a third party and may be additionally installed as an Android-based program of the application layer. For example, the service provided by the user-defined service program may be a function of collecting error logs of the image forming apparatus 100, a function of managing an image forming operation that is performed and completed in the image forming apparatus 100, a function of managing a peripheral device connected to the image forming apparatus 100, or the like.

Figure 6:
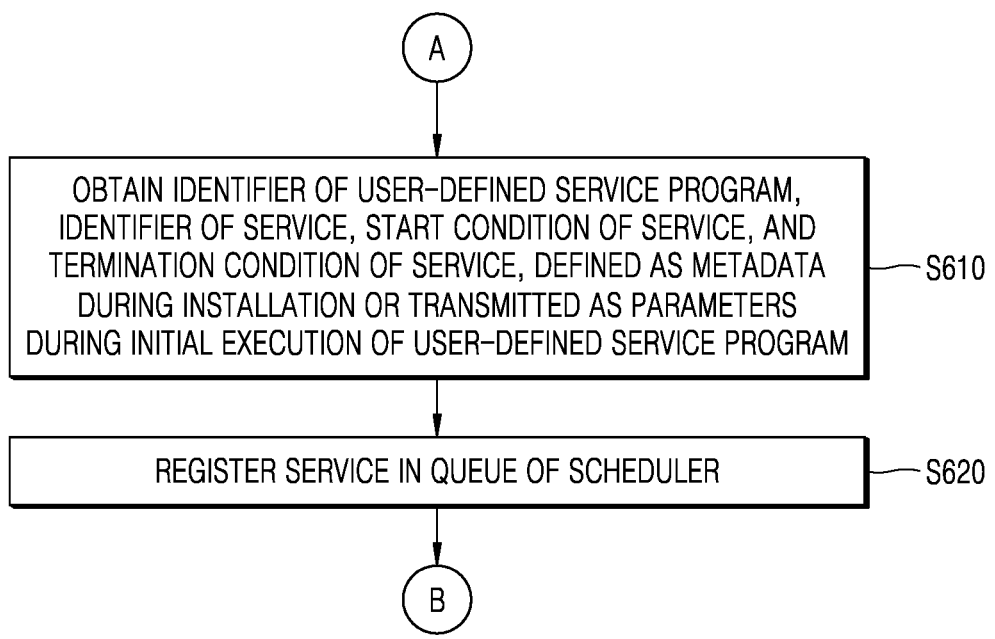
FIG. 6 is a flowchart of a process performed by a service program management module to register a service provided by a user-defined service program according to an example.

FIG. 6 is a flowchart of a process performed by a service program management module, to register a service provided by a user-defined service program according to an example.

Referring to FIG. 6, a service program management module executed in the image forming apparatus 100 may obtain an identifier of a user-defined service program, an identifier of a service, a start condition of the service, and a termination condition of the service, defined as metadata during installation of the user-defined service program or transmitted as parameters during initial execution of the user-defined service program in operation S610.

In operation S620, the service program management module may register the service in a queue of a scheduler.

Referring again to FIG. 5, in operation S530, the image forming apparatus 100 may request an operation of a system service requiring system service rights of an operation system layer and may manage the registered service. When the registered service is managed, it may mean that the start, continuation, and termination of the registered service are managed.

According to a start condition or a termination condition of the registered service, the image forming apparatus 100 may request the operation of the system service of the operating system layer and may manage the start or the termination of the registered service.

When the registered service is abnormally terminated while a life cycle of the registered service is monitored, the image forming apparatus 100 may request the operation of the system service of the operating system layer and may manage the re-start of the terminated service.

For example, the image forming apparatus 100 may request the operation of the system service corresponding to always-on execution, automatic execution, automatic recovery, or the like, and may manage the registered service.

Figure 7:
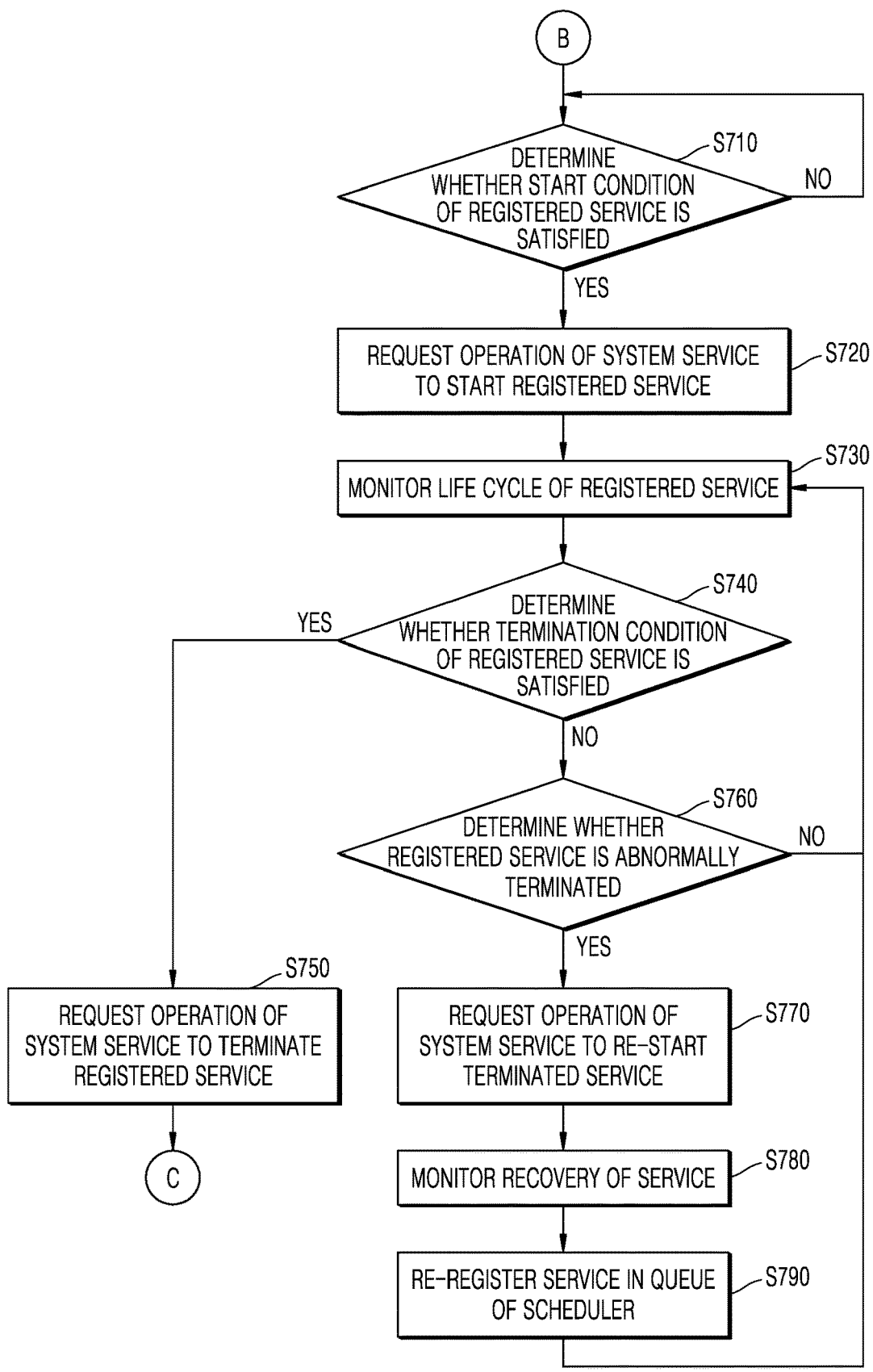
FIG. 7 is a flowchart of a process performed by a service program management module to request an operation of a system service of an operating system layer and manage a service registered in the service program management module according to an example.

FIG. 7 is a flowchart of a process performed by a service program management module to request an operation of a system service of an operating system layer and manage a service registered in the service program management module according to an example.

Referring to FIG. 7, a service program management module executed in the image forming apparatus 100 may request a system framework that provides a system service of an operating system layer for an operation of the system service for managing, for example, the start, continuation, and termination, of a registered service.

In operation S710, a service program management module executed in the image forming apparatus 100 may monitor a start condition of a registered service and may determine whether the start condition of the registered service is satisfied.

In operation S720, when the start condition of the registered service is satisfied, the service program management module may request an operation of a system service to start the registered service.

In operation S730, the service program management module may monitor a life cycle of the registered service. After the registered service starts, until a termination condition of the registered service is satisfied, the service program management module may monitor an operation state of the registered service.

In operation S740, the service program management module executed in the image forming apparatus 100 may monitor the termination condition of the registered service and may determine whether the termination condition of the registered service is satisfied.

In operation S750, when the termination condition of the registered service is satisfied, the service program management module may request the operation of the system service to terminate the registered service.

In operation S760, the service program management module may determine whether the registered service is abnormally terminated even when the termination condition of the registered service is not satisfied. When there is no abnormal termination, the service program management module may continuously monitor the life cycle of the registered service.

In operation S770, when the registered service is abnormally terminated even when the termination condition of the registered service is not satisfied, the service program management module may request the operation of the system service to re-start the terminated service.

In operation S780, the service program management module may monitor recovery of the service that is abnormally terminated.

In operation S790, the service program management module may re-register the service requested to be re-started in a queue of a scheduler to manage the life cycle of the service. The service program management module may monitor the life cycle of the re-started service.

Examples of a method, performed by an image forming apparatus, of executing a service program may be implemented as an application or a computer program stored in a non-transitory computer-readable storage medium to execute each step of the method.

The method may be implemented as a non-transitory computer-readable storage medium that stores data or instructions executable by a computer or a processor. The method may be written as a computer-executable program and may be implemented in a general-purpose digital computer that operates such a program by using a computer-readable storage medium. Examples of the computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other devices that may store instructions or software, related data, data files, and data structures and may provide the instructions or software, related data, data files, and data structures so as for a processor a computer to execute the instructions.

What is claimed is:

1. An image forming apparatus comprising:
a memory storing computer-executable instructions; and
a processor to execute the computer-executable instructions to:
execute a service program management module of an application framework layer;
according to a request of a user-defined service program having application service rights of an application layer, register a service provided by the user-defined service program in the service program management module;
request an operation of a system service requiring system service rights of an operating system layer; and
manage the registered service.

2. The image forming apparatus of claim 1, wherein the processor is further to execute the computer-executable instructions to:
request the operation of the system service of the operating system layer and manage a re-start of the registered service when the registered service is abnormally terminated while a life cycle of the registered service is being monitored.

3. The image forming apparatus of claim 1, wherein the processor is further to execute the computer-executable instructions to:
request the operation of the system service of the operating system layer and manage a start or a termination of the registered service according to a start condition or a termination condition of the registered service.

4. The image forming apparatus of claim 1, wherein the processor is further to execute the computer-executable instructions to:
request the operation of the system service corresponding to always-on execution, automatic execution, or automatic recovery and manage the registered service.

5. The image forming apparatus of claim 1, wherein the processor is further to execute the computer-executable instructions to:
obtain an identifier of the user-defined service program, an identifier of the service, a start condition of the service, and a termination condition of the service, defined as metadata during installation or transmitted as parameters during initial execution of the user-defined service program; and
register the service in a queue of a scheduler of the service program management module.

6. The image forming apparatus of claim 1, wherein the service program management module is included as system firmware of the application framework layer.

7. The image forming apparatus of claim 1, wherein the service provided by the user-defined service program comprises a function of collecting an error log of the image forming apparatus, a function of managing an image forming operation that is performed and completed in the image forming apparatus, or a function of managing a peripheral device connected to the image forming apparatus.

8. A method performed by an image forming apparatus to execute a service program, the method comprising:
executing a service program management module of an application framework layer;
according to a request of a user-defined service program having application service rights of an application layer, registering a service provided by the user-defined service program in the service program management module;
requesting an operation of a system service requiring system service rights of an operating system layer; and
managing the registered service.

9. The method of claim 8, wherein the managing of the registered service comprises, when the registered service is abnormally terminated while a life cycle of the registered service is being monitored, requesting the operation of the system service of the operating system layer and managing a re-start of the registered service.

10. The method of claim 8, wherein the managing of the registered service comprises, according to a start condition or a termination condition of the registered service, requesting the operation of the system service of the operating system layer and managing a start or a termination of the registered service.

11. The method of claim 8, wherein the managing of the registered service comprises requesting the operation of the system service corresponding to always-on execution, automatic execution, or automatic recovery and managing the registered service.

12. The method of claim 8, wherein the registering of the service comprises obtaining an identifier of the user-defined service program, an identifier of the service, a start condition of the service, and a termination condition of the service, defined as metadata during installation or transmitted as parameters during initial execution of the user-defined service program, and registering the service in a queue of a scheduler of the service program management module.

13. The method of claim 8, wherein the service program management module is included as system firmware of the application framework layer.

14. The method of claim 8, wherein the service provided by the user-defined service program comprises a function of collecting an error log of the image forming apparatus, a function of managing an image forming operation that is performed and completed in the image forming apparatus, or a function of managing a peripheral device connected to the image forming apparatus.

15. A non-transitory computer-readable storage medium storing instructions executable by a processor, the computer-readable storage medium comprising:
instructions to execute a service program management module of an application framework layer;
instructions to register a service provided by a user-defined service program in the service program management module, according to a request of the user-defined service program having application service rights of an application layer;

instructions to request an operation of a system service requiring system service rights of an operating system layer; and instructions to manage the registered service.

* * * * *